Aug. 20, 1968 J. L. E. BALDWIN ET AL 3,398,235

HEADWHEEL SPEED CONTROL SYSTEM FOR REPRODUCING MAGNETICALLY RECORDED TELEVISION SIGNALS

Filed Nov. 6, 1964 8 Sheets-Sheet 1

INVENTORS
JOHN LEWIS EDWIN BALDWIN
JOHN DAVID MILLWARD
BY Kane and Nydick
ATTORNEYS INVENTORS
JOHN LEWIS EDWIN BALDWIN
JOHN DAVID MILLWARD
BY Hane and Nydick
ATTORNEYS INVENTORS
JOHN LEWIS EDWIN BALDWIN
JOHN DAVID MILLWARD
BY Haseltine and Nydick
ATTORNEYS INVENTORS
JOHN LEWIS EDWIN BALDWIN
JOHN DAVID MILLWARD
BY Hane and Nydick
ATTORNEYS INVENTORS
JOHN LEWIS EDWIN BALDWIN
JOHN DAVID MILLWARD
BY Hane and Nydick
ATTORNEYS INVENTORS
JOHN LEWIS EDWIN BALDWIN
JOHN DAVID MILLWARD
BY Hane and Nydick
ATTORNEYS Aug. 20, 1968 J. L. E. BALDWIN ET AL 3,398,235

HEADWHEEL SPEED CONTROL SYSTEM FOR REPRODUCING MAGNETICALLY RECORDED TELEVISION SIGNALS

Filed Nov. 6, 1964 8 Sheets-Sheet 7

INVENTORS
JOHN LEWIS EDWIN BALDWIN
JOHN DAVID MILLWARD
BY Hane and Nydick
ATTORNEYS INVENTORS
JOHN LEWIS EDWIN BALDWIN
JOHN DAVID MILLWARD
BY Hane and Nydick
ATTORNEYS United States Patent Office 3,398,235

Patented Aug. 20, 1968

3,398,235

HEADWHEEL SPEED CONTROL SYSTEM FOR REPRODUCING MAGNETICALLY RECORDED TELEVISION SIGNALS

John Lewis Edwin Baldwin, Croydon, and John David Millward, Orpington, England, assignors to Rank-Bush Murphy Limited Filed Nov. 6, 1964, Ser. No. 409,418
Claims priority, application Great Britain, Nov. 13, 1963, 44,802/63
6 Claims. (Cl. 178—6.6)

ABSTRACT OF THE DISCLOSURE

There is disclosed an apparatus for reproducing television signals recorded on magnetic tape as a succession of laterally-extending traces, by scanning the traces with transducer heads carried upon a rotatable wheel. The apparatus includes means for controlling the speed of rotation of the head wheel either by a first signal derived by phase comparison between signals having like frequencies derived respectively from the reproduced synchronizing signals and from a local synchronizing signal, or by a second signal derived by phase comparison between signals of like frequencies proportional respectively to the speed of rotation of the head wheel and to the local synchronizing frequencies.

Figure 1:
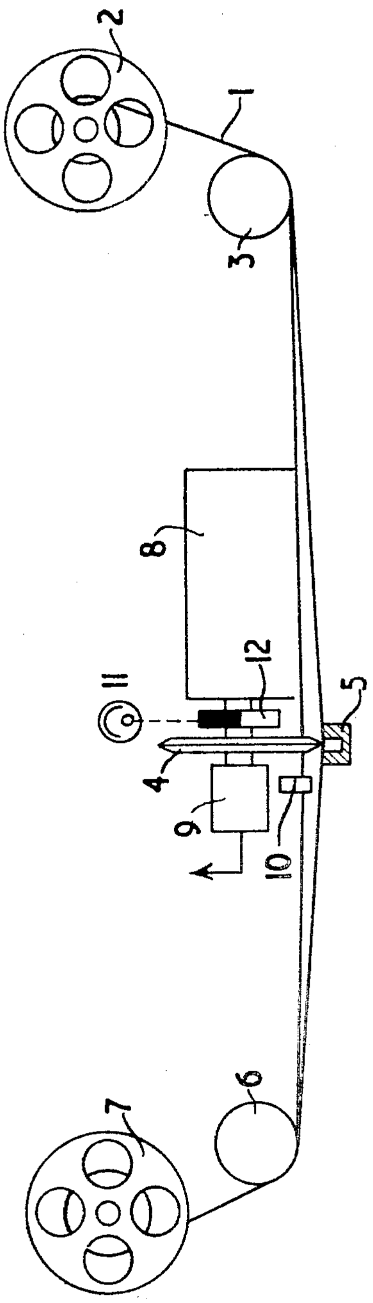

This invention relates to apparatus for reproducing television signals which have been recorded upon magnetic tape as a succession of record traces extending laterally of the tape. Records of this type are reproduced by scanning the tape by transducer means fed with the signal to be recorded carried upon the periphery of a revolvable member past which and in contact with said transducers the tape is translated at a speed appropriately related to the speed of rotation of the member. Records of this kind are commonly used to provide television signals for inclusion in programmes originating from sources other than recordings. When such combined programmes are to be produced it is necessary for the television signals reproduced from the magnetic tape to be correctly synchronised in both line and frame synchronism with the synchronising signal generator used to control the other signal sources which are used.

Known apparatus for reproducing television signals laterally recorded upon magnetic tape have not included any satisfactory provision for producing frame synchronism between the signals reproduced from the tape and external controlling signals.

In its broadest aspect the present invention comprises apparatus for reproducing television signals recorded upon magnetic tape as a succession of record traces extending laterally of said tape by transducer means carried upon a revolvable member past which said tape is translated at a speed fixedly related to the speed of rotation of said member, said apparatus comprising first comparator means fed with frame signals derived from an external source and with frame signals derived from said reproduced television signal and deriving a first control voltage from the phase comparison of said signals, second comparator means fed with a signal fixedly related in frequency to that of vertical synchronising signals derived from said external source and with signals of frequency proportional to the speed of rotation of said member and deriving a second control signal from the phase comparison of said signals, together with means operable to apply selectively said first, or said second control voltages to vary the speed of rotation of said member so as to tend to produce a constant phase relation between said compared signals.

A preferred embodiment of apparatus according to the present invention for reproducing television signals recorded as a succession of traces extending laterally of a magnetic tape by means of one or more transducer heads carried upon a revolvable head wheel past which said tape is transported under the control of a capstan operated so as to produce a fixed relation between the speed of rotation of said head wheel and the speed of translation of said tape, comprises means for comparing the phase of frame signals derived from said reproduced television signals with that of frame signals derived from said external source to develop a first control voltage such as when applied to control said speed of rotation will bring said frame synchronising signals into phase coincidence, means for comparing the phase of a signal fixedly related in frequency and phase to a vertical synchronising signal derived from said external source with that of a speed signal of which the frequency is proportional to the speed of rotation of said head wheel and for deriving as a result of this comparison a second control voltage which when applied to vary said speed produces a constant phase relation between said signal and said speed signal, means for comparing the phase of further signals repetitive at a frequency proportional to said speed of rotation with that of a control signal having a repetition frequency proportional to the speed of translation of said tape and for deriving as a result of this comparison a third control voltage which when applied to vary said speed of translation produces a constant phase relation between said further signals and said control signal, together with means operable to apply said first or said second control voltage to control said speed of rotation.

In operating apparatus according to this embodiment of the invention it will be advantageous initially to employ said second control voltage to control the speed of rotation of the head wheel until stable operation has been achieved. The first control voltage may then be used to control the speed of the head wheel in place of the second control voltage until frame synchronisation has been achieved.

Another embodiment of the present invention comprises apparatus for reproducing television signals recorded as a succession of traces extending laterally of a magnetic tape by means of one or more transducer heads carried upon a revolvable head wheel past which said tape is transported under the control of a capstan, said apparatus including means for comparing the phase of first frame signals derived from field synchronising signals commencing alternate fields of said reproduced television signal with that of second frame signals derived from field synchronising signals commencing like alternate fields derived from an external source and for deriving as a result of this comparison a first control voltage which may be applied to control the frequency of a reference oscillator, means for comparing the phase of vertical synchronising signals derived from said external source with a first reference signal derived from said reference oscillator and for producing as a result of this comparison a second control voltage which when applied to control the operation of said reference oscillator produces a constant phase relation between said synchronising signal and said first reference signal, means for comparing the phase of further signals having a frequency proportional to said speed of rotation with that of control signals having a frequency proportional to the speed of translation of said tape and for deriving as a result of this comparison a third control voltage which is applied to vary the speed of said capstan in such a manner as to produce a constant phase relation between said further signal and said control signal, means for comparing the phase of a second reference signal derived from said reference oscillator with that of speed signals having a frequency proportional to the speed of rotation of said head wheel and for deriving as a result of this comparison a fourth control voltage which is applied to vary said speed of rotation so as to produce a constant phase relation between said second reference signal and said speed signal, together with change-over means operable to apply either said first control voltage, or said second control voltage to control the frequency of said reference oscillator.

Apparatus according to this embodiment of the invention preferably also includes means for applying said first control voltage to control the frequency of the reference oscillator and thus said speed of rotation of said head wheel in place of said second control voltage when that head which was used to record the field synchronising signals is being used to reproduce them and when coincidence between said frame synchronising sigals has been produced.

Figure 2:
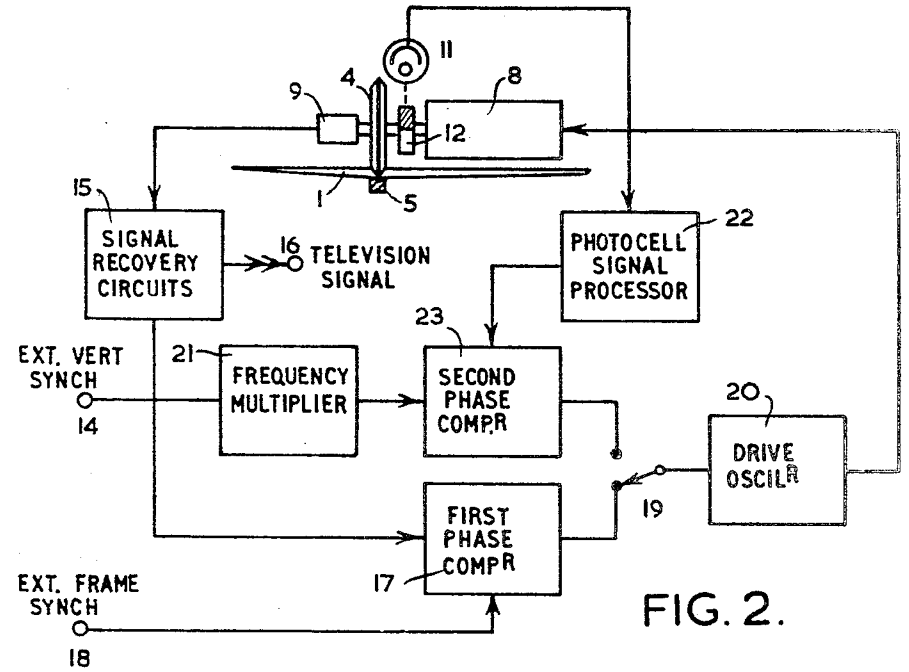
Figure 3:
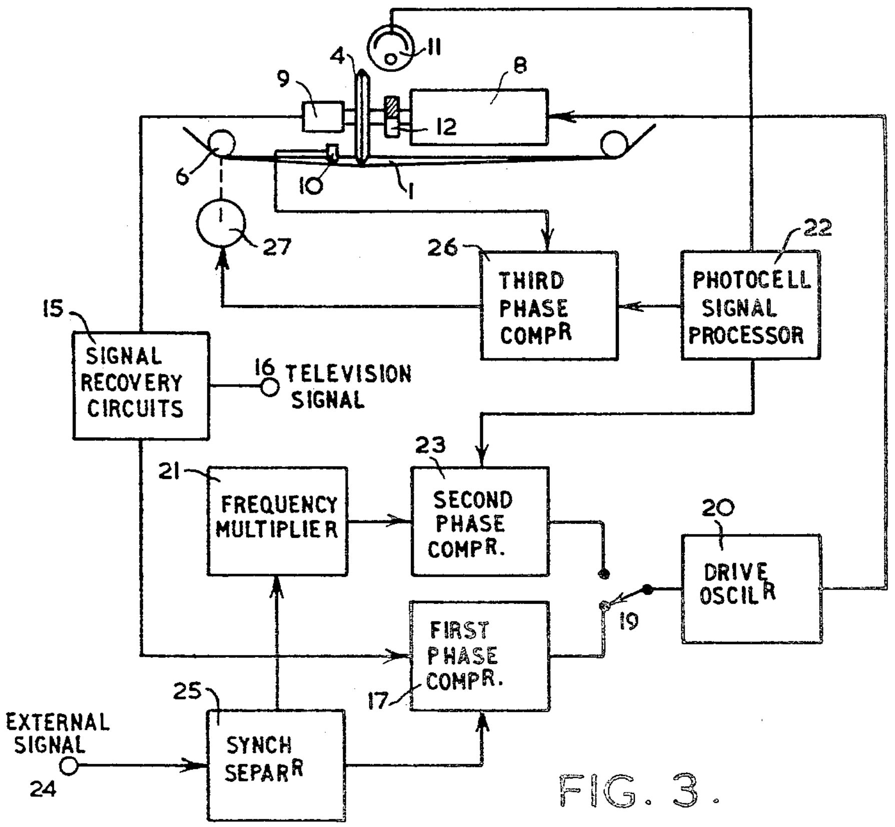
Figure 4A:
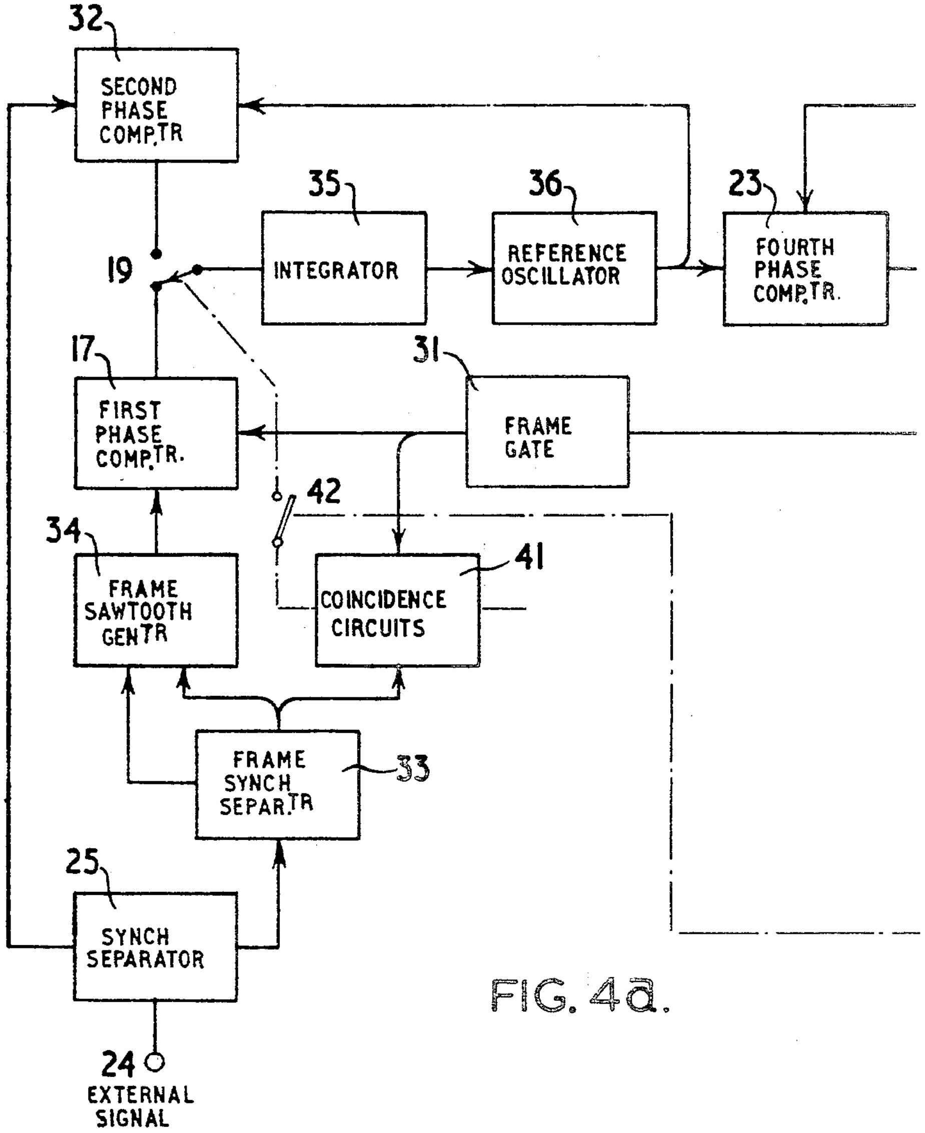
Figure 4B:
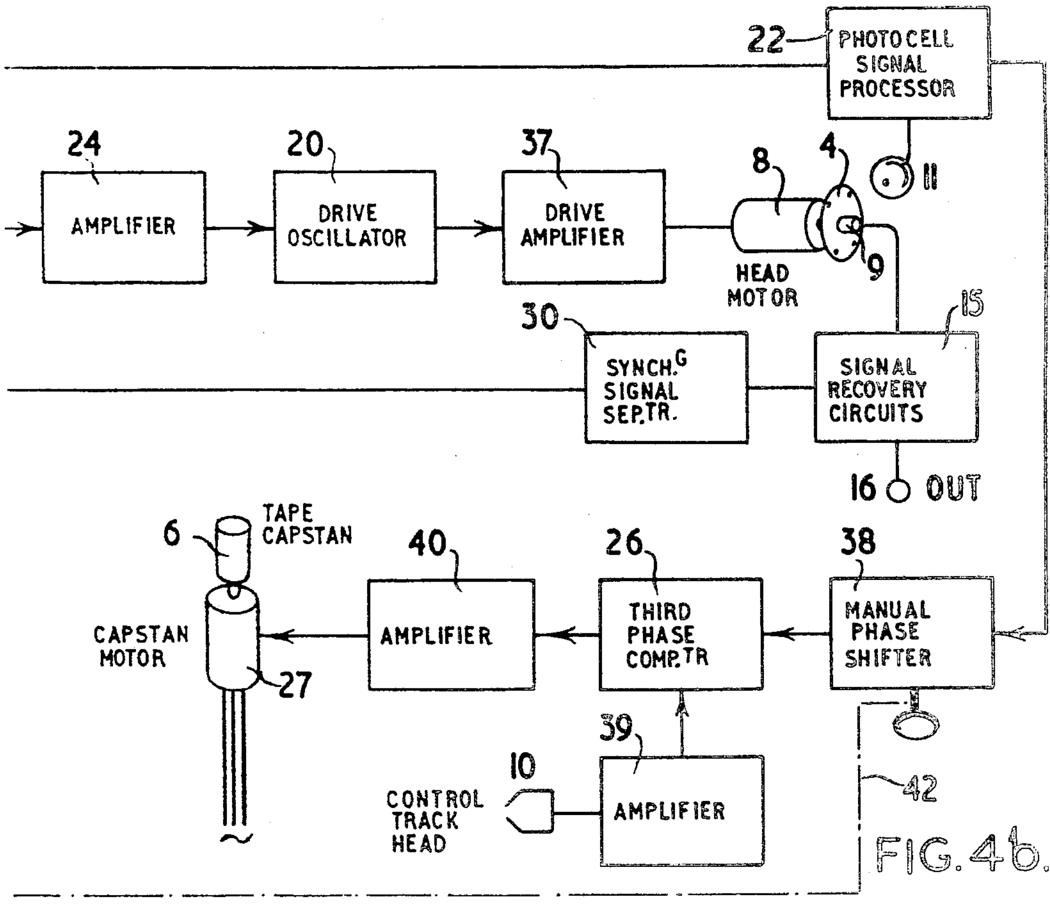
Figure 5:
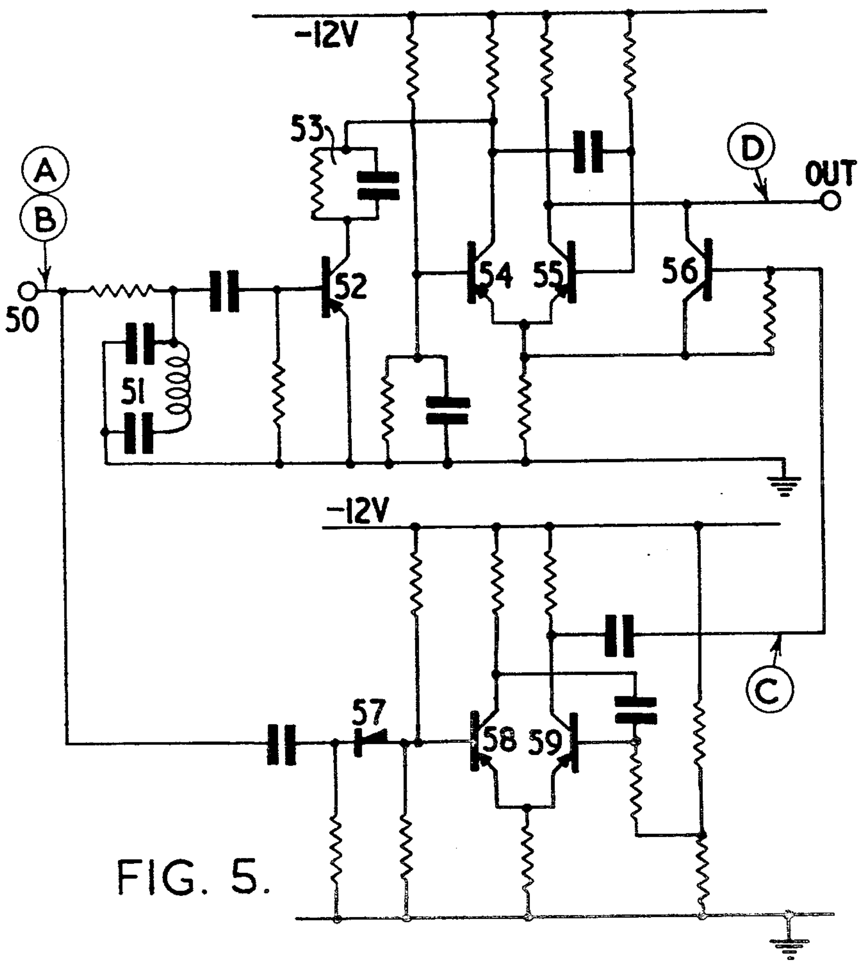

Features and advantages of the invention will appear from the following description of embodiments thereof, given by way of example, in conjunction with the accompanying drawings, in the several figures of which like elements are denoted by like reference numerals and in which:

FIGURE 1 is a schematic diagram illustrating the mechanical arrangements of one type of magnetic tape reproducing apparatus to which the present invention is applicable, FIGURE 2 is a block diagram illustrating the present invention in its broadest aspect, FIGURE 3 is a block diagram illustrating one embodiment of the present invention, FIGURES 4*a* and 4*b* are a block diagram illustrating another embodiment of the present invention, FIGURE 5 is a circuit diagram of apparatus suitable for performing the function of one of the elements of the apparatus described in relation to FIGURE 4.

Figure 6:
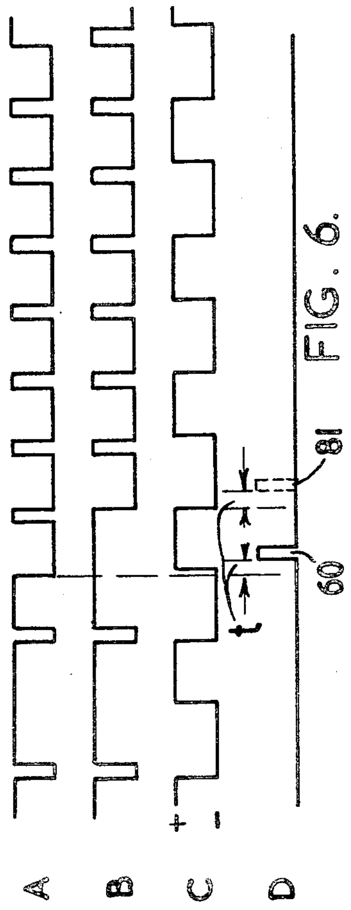
Figure 8:
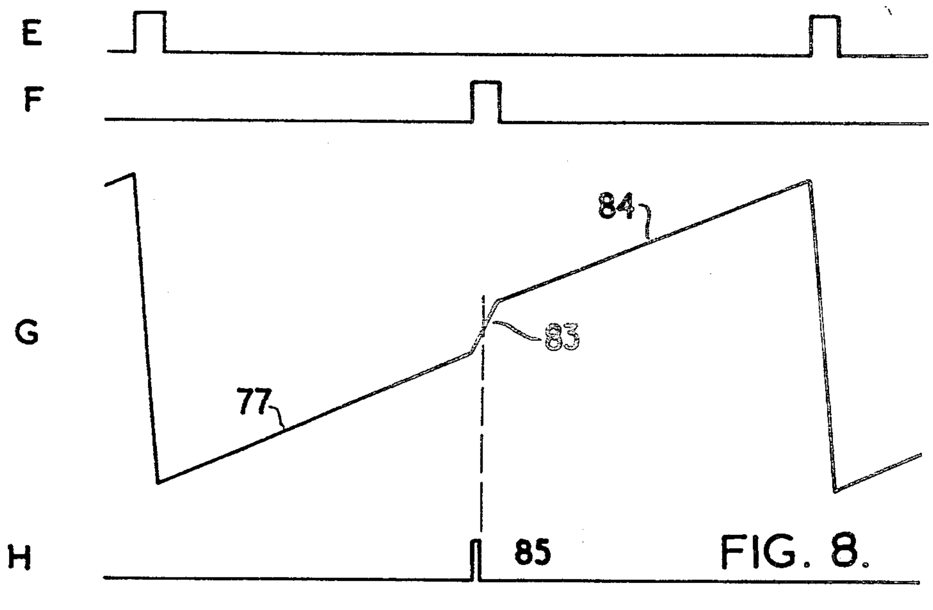
Figure 7:
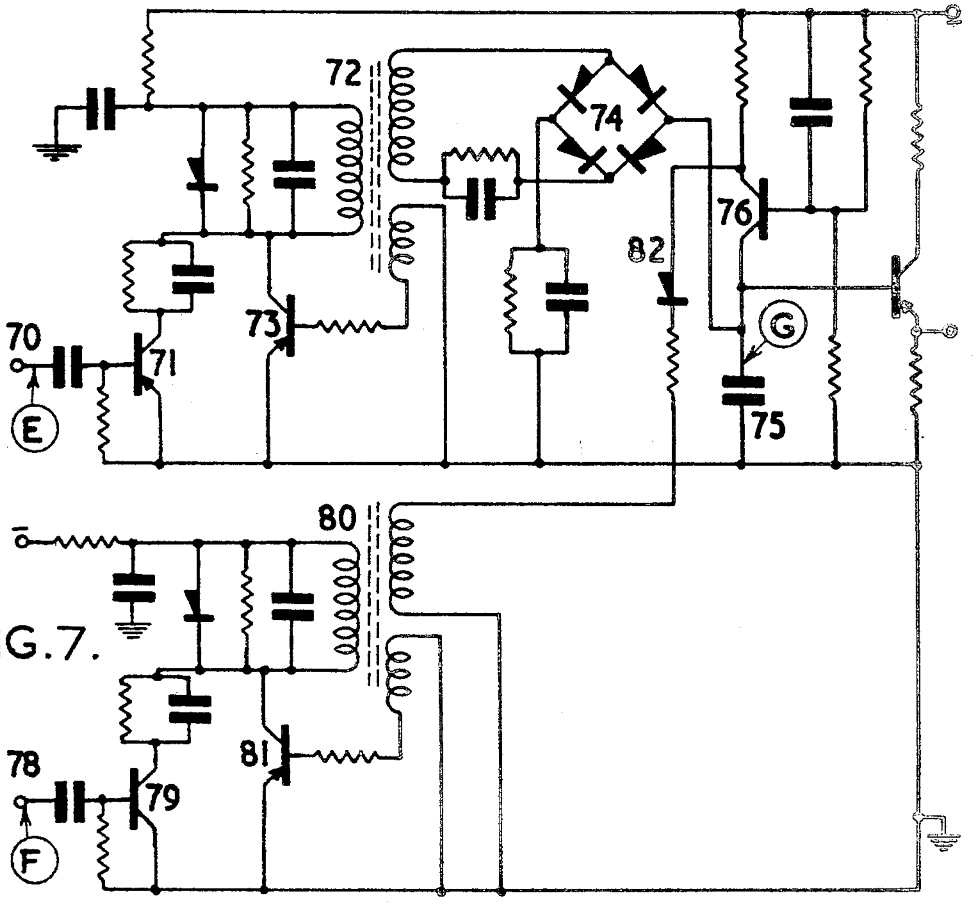
Figure 9:
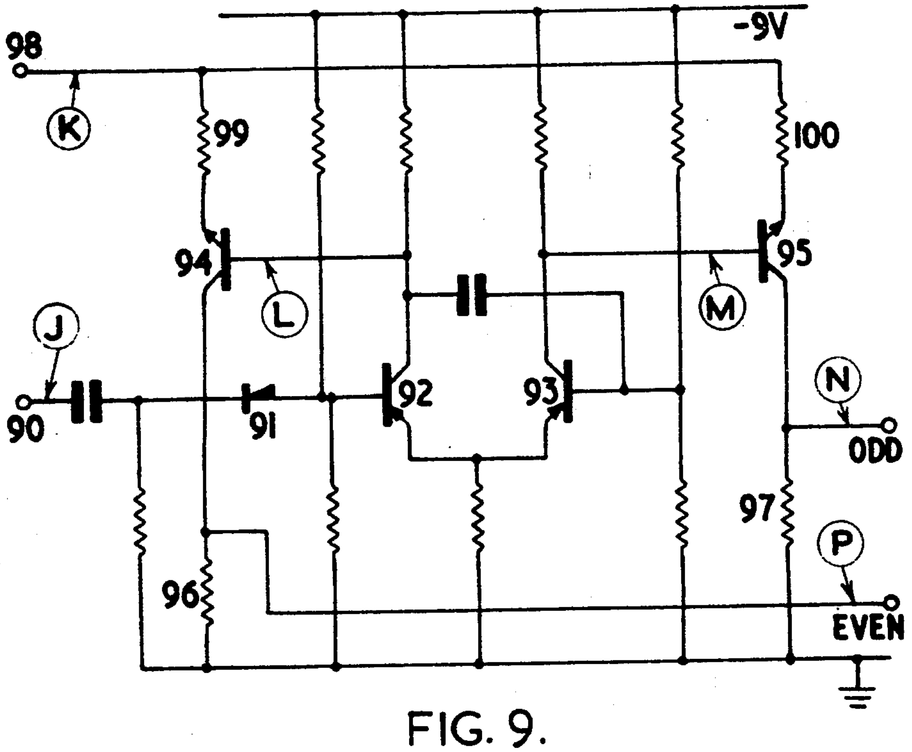
Figure 10:
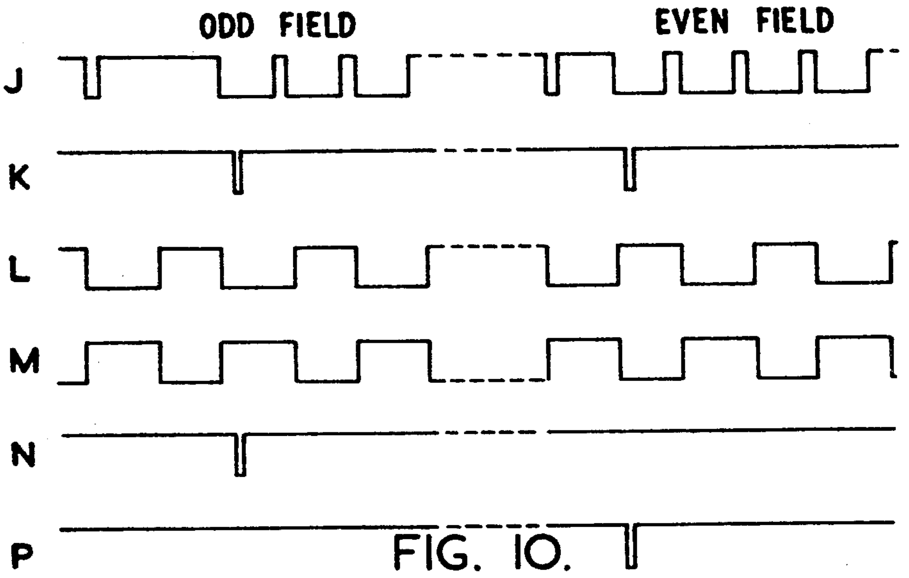

FIGURE 6 comprises waveform diagrams illustrating the operation of the apparatus described in relation to FIGURE 5, FIGURE 7 is a circuit diagram of apparatus suitable for performing the function of another element of the apparatus described in relation to FIGURE 4, FIGURE 8 comprises waveform diagrams illustrating the operation of the apparatus described in relation to FIGURE 7, FIGURE 9 is a circuit diagram of apparatus suitable for performing the function of a further element of the apparatus described in relation to FIGURE 4, and FIGURE 10 comprises waveform diagrams illustrating the operation of the apparatus described in relation to FIGURE 9.

In the apparatus schematically illustrated in FIGURE 1 a magnetic tape 1 is drawn from a feed spool 2 over a guide roller 3 past a head wheel 4 carrying on its periphery a plurality, specifically four, of transducer heads against which tape 1 is urged by a slotted guide shown in section at 5. Tape 1 is traversed by a capstan roller 6 driven by an electric motor (not shown) and is finally wound upon a take-up spool 7. Head wheel 4 is rotated by another electric motor 8 and connection is made to the transducer heads by way of a slip-ring and brush assembly 9 of known type. In the vicinity of head wheel 4 is arranged a control track transducer head 10 which is arranged to reproduce signals previously recorded upon a control track extending along the margin of tape 1. Signals related to the speed of rotation of head-wheel 4 are obtained from a photocell exposed to light from a patterned drum 12 which is mounted on the shaft of head-wheel 4 and is illuminated by a suitable light source not shown.

The apparatus shown in FIGURE 2 illustrates the present invention in its broadest form. Television signals which have been recorded upon a magnetic tape 1 in a succession of traces extending laterally of the tape are reproduced by transducer means carried on the periphery of a revolvable member 4. The signals so reproduced are passed by way of a slip-ring device 9 to a device 15 containing signal recovery circuits. Where as is usually the case the recorded signals have been recorded as frequency modulations of a carrier, circuits 15 will comprise the appropriate known circuits for demodulating the reproduced frequency-modulated signals. Other methods of recording will require appropriately different circuits in device 15. Device 15 is also assumed to comprise known circuits for deriving from the reproduced television signal the frame synchronising component, that is, a signal repetitive at the picture repetition rate of the television system. Assuming that the apparatus has been run up to its correct speed, these frame synchronising signals are applied to a first phase comparator 17 in which they are compared with frame synchronising signals from an external source received at a terminal 18. This external source will in general be the master synchronising impulse generator for the television station. Phase comparator 17 develops a control voltage which is applied by way of a switch 19 in the position shown to control the frequency and phase of a drive oscillator 20, which supplies the alternating current drive to head-wheel motor 8 driving the revolvable member or head-wheel 4. By this means it is ensured that the frame synchronising signals in the television signal recovered from the tape are correctly in phase with those received from the external source at terminal 18. It is thus possible to mix the signals recovered from the tape with other signals synchronised from the external source without synchronisation disturbance due to incorrect frame synchronism.

However, this condition is somewhat disadvantageous for continuous operation, for the relative conditions of the external and off-tape signals re-compared only every $\frac{1}{25}$ second. It is therefore desired to be able to return to a known method of operation in which signals having a frequency proportional to the speed of rotation of the head drum are compared with signals locked to the external signal. To do this it is necessary to employ a frequency multiplier to which are applied vertical synchronising signals, that is, signals repetitive at twice the frame rate, which are received at an input terminal 14. Frequency multiplier 21 is arranged to increase the frequency of the incoming signal by a factor of five, so that its output signals have a frequency of 250 c./s. This is also the frequency of a set of signals which are developed in a photocell signal processor 22 from signals originating in photocell 11 and are applied to a second phase comparator 23. The signals from frequency multiplier 21 are also applied to phase comparator 23 and the resultant control voltage is applied by way of switch 19 when reversed from the position shown to control drive oscillator 20 and thus the speed of rotation of head-wheel 4. In operating apparatus as described in relation to FIGURE 2 the switch 19, which may of course be an electronic switching device making use of transistors, will during normal running be set to the condition in which drive oscillator 20 is controlled by the control voltage from the second phase comparator. Only after first starting up, or when a change in the operation of the external source makes this desirable, will the apparatus be adjusted so that the control voltage from the first phase comparator controls the drive oscillator. At other times it will be preferable for the second control voltage to be used, for this is derived as a result of comparing more rapidly repetitive signals and in consequence gives a closer control of head-wheel speed.

The apparatus shown in FIGURE 3 is largely identical with that described in relation to FIGURE 2 and like circuit elements are denoted by the same reference numerals. Here, however, the apparatus is fed at an input terminal 24 with mixed synchronising signals from the external source. From these mixed synchronising signals a device 25, consisting in part of a normal circuit arrangement for separating vertical from horizontal synchronising signals and in part of an arrangement for identifying odd and even field synchronising signals, and thus for deriving frame synchronising signals which will be described below in relation to FIGURE 5, is arranged to develop frame synchronising signals which are applied to a first phase comparator 17 for use as described in relation to FIGURE 2 and also vertical synchronising signals which are applied to a frequency multiplier 21, again for use as described in relation to FIGURE 1. The apparatus shown in FIGURE 3 also differs from that of FIGURE 2 in including a third phase comparator 26 which is fed wtih signals of frequency proportional to the speed of translation of tape 1 which are derived from control head 10 and with signals of like frequency derived by photocell signal processor device 22. The control voltage derived by comparison of these two signals in third phase comparator 26 is applied to control the speed of a motor 27 which drives the tape transport capstan 6 and thus controls the speed of translation of the tape.

FIGURE 4 is a block schematic diagram of a preferred embodiment of the invention. Once again, elements of the circuit operating identically with elements already described are denoted by the same reference numerals. Here again television signals recovered from a magnetic tape by transducer means carried on a head wheel 4 are taken by way of a slip-ring device 9 to signal recovery circuits 15 of known kind which yield at output terminal 16 a television signal corresponding with that initially recorded upon the tape. The recovered signals are also applied to a known form of synchronising signal separator 30 in which the synchronising components are separated from the vision component of the recovered television signal and in addition the vertical and horizontal synchronising components are separated from one another, only the vertical synchronising component being fed out to a frame gate 31 in which, as described in relation to FIGURE 5 the odd field pulses are separated from the succession of odd and even field pulses and are passed on to first phase comparator 17. Here, as in other embodiments of the invention, the off-tape frame pulses are compared in phase with frame pulses derived from an external source, usually the station mixed synchronising signal. In the present embodiment the mixed synchronising signals are received at an input terminal 24, whence they are applied to a synchronising signal separator 25 of known type which separates the vertical synchronising signals and applies these on the one hand to a second phase comparator 32 and on the other hand to a frame synchronising separator 33, described in more detail in relation to FIGURE 9, in which odd and even field pulses are extracted separately. The frame pulses thus produced are used to control a sawtooth generator which supplies a sawtooth voltage waveform of frame repetition rate to the first phase comparator 17.

When switch 19 is in the position shown the output from phase comparator 17 is fed by way of an integrator circuit 35 to control a reference oscillator 36 conveniently having a frequency of 250 c./s. An output signal from reference oscillator 36 is fed back to the second phase comparator 32 in which it is compared with the incoming vertical synchronising signal to yield a control voltage which, when switch 19 is reversed from the position shown, is applied to integrator 35 and thence to control reference oscillator 36. In this latter setting of switch 19, therefore, oscillator 36 is locked to the incoming vertical synchronising signal instead of being controlled by a voltage derived from phase comparison of the off-tape and station frame signals.

However it is controlled, an output from reference oscillator 36 is applied to a fourth phase comparator 23 in which it is compared in phase with a signal of like frequency derived from a photocell signal processor 22 as described in relation to FIGURES 2 and 3. The control voltage derived from phase comparator 23 is applied by way of a direct-voltage amplifier 24 to control a drive oscillator 20, of which the output is fed by way of a drive amplifier 37 to the head-wheel motor 8.

Photocell signal processor also yields other signals which are fed by way of a manually-adjustable phase shifter 38 to a third phase comparator 26, in which they are compared in phase with signals derived by way of an amplifier 39 from control-track reading head 10. The control voltage provided by a third phase comparator 26 is applied by way of an amplifier 40 to control capstan drive motor 27. Capstan drive motor 27 may conveniently be a three-phase motor fed from the public alternating current supply and arranged so that the passage of a direct current through certain of its windings produces an eddy-current braking action which appropriately controls its speed, so that each sweep of a transducer device carried by head wheel 4 will traverse a record trace on tape 1.

The frame signals separated by frame gate 31 and those derived from frame synchronising separator 33 are applied to a coincidence circuit 41 which when these signals exactly correspond produces a voltage capable of operating switch 19, which may be a relay or an equivalent solid-state switching device. When manual phase shifter 38 is set to that position in which transducer head which was used to record the field synchronising signals is also being used to reproduce them, a microswitch 42 is operated as indicated by chain-line 43 to allow the output potential from coincidence circuit 41 to operate switch 19 and thus to cause integrator 35 to be fed with the control signal from the second phase comparator 32 instead of with that from the first phase comparator. When this occurs the fourth phase comparator, which is fed with the signal from reference oscillator 36, that is, with a signal locked in frequency to the vertical synchronising signals received from an external source by way of terminal 24.

The signal from oscillator 36 has a frequency of 250 c./s. as do the pulse signals from photocell signal processor 22 with which they are compared in the fourth phase comparator. The rate at which error information is derived by phase comparator 23 is thus ten times as great as that which arises by the direct comparison of the frame signals. This ensures increased accuracy of control and the "flywheel" effect of the reference oscillator is not disadvantageous, for the likely rate of change of phase between the "station" synchronising signals received at terminal 24 and the "off-tape" signals from synchronising signal separator 30 is not usually high.

The apparatus illustrated by FIGURE 5 is suitable for performing the functions of frame gate 31 of the apparatus shown in FIGURE 4, that is, for deriving from synchronising signals of standard form reproduced from the magnetic tape a signal repetitive only at the frame frequency and, specifically, occurring at the time of occurrence of the field synchronising impulse which commences an odd-line field of the scan. It is equally possible to use the circuit arrangement to be described to yield a pulse whenever the field synchronising signal commencing an even-line frame is present, but for the present purpose an "odd-field" pulse is preferred.

Negative-going mixed synchronising signals separated from the reproduced television signal by a conventional synchronising signal separator circuit 30 are received at an input terminal 50 from which they are applied to a delay line 51 which is unterminated at the far end. The applied signal is therefore reflected to the input of the line in the same polarity as that in which it is applied after a time equal to twice the signal delay of the line, which is chosen to be 6 $\mu$s. The signals arising at the input to the line are applied to the base of a pnp transistor 52. Since the emitter of transistor 52 is earthed and as its base is also returned to earth it can be caused to conduct only by negative-going signals applied to its base. The time-constant of the base circuit of the transistor is made sufficiently large, conveniently some 250 ms., that the base potential stabilises at a value somewhat less than the peak potential of the combined initial and reflected signals applied to the delay line 51 but greater than the peak value of the initial signals received at terminal 50. Transistor 52 will therefore conduct, only during those periods in which reflected signals are present at its base. The collector of transistor 52 is returned to the negative line by way of the parallel combination 53 of a capacitor and a resistor and by the way of the collector load resistor of a transistor 54. Transistor 54, together with a further transistor 55, forms a monostable multivibrator of which the operation may be inhibited by another transistor 56 having its collector-emitter path connected in parallel with that of transistor 55. The purpose and mode of operation of transistor 56 is fully explained later in this document. Transistors 54, 55 are coupled by a common emitter resistor and by the collector of transistor 54 being coupled to the base of transistor 55 by way of a capacitor. The base of transistor 55 is returned to the negative supply line by way of a resistor, while its collector is also returned to the negative line by way of a load resistor, signals appearing across which are fed out by way of an output terminal OUT. The base of transistor 54 is appropriately biased by means of a voltage divider connected across the supply, and is bypassed to earth by way of a capacitor.

The time-constant provided by the parallel combination 53 of capacitor and resistor in the collector lead of transistor 52 is made such that an appreciable change in the current passed by transistor 52 occurs only on the leading edge of the first broad pulse of the series comprising a field synchronising signal. A convenient value for this time constant is 1 $\mu$s.

When transistor 52 passes current for the first time in response to the leading edge of the first broad pulse of a field synchronising signal the resultant positive-going change in potential appearing at the collector of transistor 54 is applied by way of the coupling capacitor to the base of transistor 55. This transistor is normally conductive owing to its base being returned to the negative line while that of transistor 54 is held at a more positive potential. The positive-going signal now applied to its base causes transistor 55 to be cut off so that, ignoring for the present the action of transistor 56, the multivibrator formed by transistors 54, 55 will pass into its quasi-stable condition with transistor 54 conducting and transistor 55 cut off. The time-constant which determines the duration of this condition is chosen to yield a negative-going pulse of 8$\mu$s. duration at the collector of transistor 55 and hence at the output terminal.

The operation of that part of the circuit arrangement of FIGURE 5 which has so far been discussed is to yield at the output terminal a negative-going pulse of 8 $\mu$s. duration delayed by 12$\mu$s. with respect to the leading edge of the first broad pulse of each field synchronising signal.

The manner in which those pulses corresponding to the "even-line" field synchronising signals are suppressed will now be explained.

The negative-going synchronising signals received at terminal 50 are also applied to a diode 57. The values of the coupling capacitor and base resistor are so chosen that the applied pulses are differentiated and thus only the signals corresponding to the leading edges of the negative-going synchronising signals can pass through diode 57 to the base of a transistor 58. This transistor is coupled to a further transistor 59 by a common emitter resistor and by a capacitor connected from the collector of transistor 58 to the base of transistor 59 so as to form a monostable multivibrator yielding at the collector of transistor 59 a square-wave signal of which the periodicity is equal to the line duration. The quasi-stable condition of the multivibrator is arranged to persist for rather more than half a line period, in point of fact for some two microseconds longer, so as to ensure the suppression of the unwanted field pulses. The base of transistor 58 is connected to the negative and positive lines by way of resistors to hold it at an appropriate bias potential while the base of transistor 59 is appropriately biased by returning it through a resistor to the tapping of a potential divider connected across the supply. The duration of the quasi-stable condition into which monostable multivibrator 54, 55 passes when triggered is arranged to be somewhat greater than one-half a line period.

Transistors 58, 59 have their collectors returned to the negative line by way of respective load resistors and signals appearing at the collector of transistors 59 are fed by way of a coupling capacitor and applied across the base resistor of transistor 56. When the signal at the collector of transistor 59 is negative-going transistor 56 will pass current. During this condition the conductive collector-emitter path of transistor 56 prevents any change in the common emitter potential of transistors 54, 55, 56 appearing when transistor 55 is cut off. Only when the signal at the collector of transistor 59 is positive-going is transistor 56 cut off. When this is so, the application of a signal from transistor 52 to the base of transistor 54 initiates the production of an 8$\mu$s. pulse. This condition arises only in respect of the interval immediately following the commencement of an ODD-field synchronising signal, that is, the field synchronising signals which commences an odd-line scanning field.

The operation of this circuit arrangement may be more clearly understood by reference to FIGURE 6, which illustrates the waveforms of signal voltages arising at certain points in the circuit described above in relation to FIGURE 5. Waveforms A and B in FIGURE 6 represent respectively the ODD and EVEN field synchonising signals received at terminal 50. Waveform C of FIGURE 6 illustrates the square-wave voltage signal developed by multivibrator 58, 59 and applied to control inhibiting transistor 56, which will be conductive and therefore active to inhibit the operation of multivibrator 54, 55 when this waveform is negative-going. Waveform D shows that the pulse 60 developed by multivibrator 61, 62 and commencing at a time delayed by *t* with respect to the leading edge of the first broad pulse of the ODD-field synchronising signal occurs during a period in which waveform C is positive-going and will therefore appear at output terminal, whereas the pulse 61 shows in broken line, which is similarly delayed by a time *t* with respect to the EVEN-field signal, would occur during a time in which the operation of multivibrator 54, 55 is suppressed by waveform C being negative and transistor 56 being active to inhibit the operation of the multivibrator.

The circuit diagram given in FIGURE 7 shows one embodiment of apparatus suitable for performing the function of frame sawtooth generator 34 of FIGURE 4. To terminal 70 there are applied from frame synchronising separator 33 of FIGURE 4 negative-going pulses shown in FIGURE 8E repetitive at the commencement of every even-line field of the external television signal. These pulses are applied to the base of a transistor 71 which is thus caused to pass current and to trigger the action of a blocking-oscillator comprising a transformer 72 and a transistor 73. The pulse generated by the blocking oscillator is applied to a four-diode gating circuit 74 which when so pulsed becomes conductive to discharge a capacitor 75. When the pulse from the blocking oscillator 72, 73 ceases, capacitor 75 commences to charge from a constant-current device of known kind including transistor 76 at a first, lower rate, thus generating across capacitor 75 the portion of the voltage waveform shown at 77 in FIGURE 8G.

To terminal 78 there are applied from frame synchronising separator 33 of FIGURE 3 negative-going pulses, shown by waveform 8F, which occur at the commencement of every odd-line field. These pulses are applied to the base of a transistor 79 to trigger a blocking oscillator comprising a transformer 80 and a transistor 81 which generates a brief pulse. This pulse is applied by way of a diode 82 to the emitter of constant-current transistor 76 to cause a large increase in the rate of rise of the potential across capacitor 75, as shown by portion 83 of waveform 8G. At the end of the pulse from blocking oscillator 80, 81 the rate of charge of capacitor 75 returns to its lower rate as illustrated by portion 84 of waveform 8G.

The purpose of this form of sawtooth is to provide greatly increased accuracy of phase comparison. When the voltage waveform illustrated in 8G is applied to the first phase comparator 17 of FIGURE 4 it is sampled by a brief pulse from frame gate 31, which conveniently has the waveform shown in 8H. When the desired phase relation between the compared signals is obtained the trailing edge 85 of sampling pulse H occurs midway in the duration of the steeply-rising portion 83 of the sawtooth waveform, as indicated in FIGURE 8 at waveforms G and H. Thus a very rapid and accurate control is obtained over the region of close synchronisation, while over the whole frame period the sense of the control voltage developed is always such as to urge the apparatus towards synchronism.

FIGURE 9 illustrates apparatus which may be conveniently employed for performing the functions of frame synchronising separator 33 of FIGURE 4, that is of providing separate trains of output pulses associated respectively with the odd-line field and even-line field synchronising signals.

Mixed negative-going synchronising signals, illustrated by waveform J of FIGURE 10, are applied to the apparatus of FIGURE 9 at terminal 90, from which they are applied by way of a diode 91 to the base of a transistor 92. This transistor is coupled to a further transistor 93 to form a known type of monostable multivibrator. The incoming pulses trigger this multivibrator from its stable condition into its quasi-stable condition which is arranged to persist for somewhat more than one half of a line period. There thus arise at the collectors of transistors 92, 93 respecitvely the voltage waveforms illustrated by 10L and 10M.

The collector of each of transistors 92, 93 is connected to the base of an individual npn transistor, 94, 95 respectively. The collectors of transistors 94, 95 are returned to the earth line by way of load resistors 96, 97 respectively, while their emitters are fed by way of a terminal 98, respective resistors 99, 100 with negative-going pulses derived from the leading edges of the first broad pulse in each field synchronising signal by means of an arrangement such as that already described with reference to FIGURE 5. These pulses are illustrated by waveform 10K. It is arranged that on the application of a negative-going field pulse to terminal 98, only that one of transistors 94, 95 will conduct of which the base is at the more positive of the two potentials applied to it from the collector of its associated multivibrator transistor. It may be seen from the waveforms of FIGURE 10 that transistor 95 will thus conduct for the ODD fields and transistor 94 for the EVEN fields. There thus appear at output terminals ODD, EVEN respectively the pulses shown by waveforms 10N, 10P, which correspond with the ODD and EVEN field synchronising signals respectively.

The remaining elements of the apparatus described in relation to FIGURE 4 may all be of conventional design suitable to the functions to be performed and are not thought to need detailed description to those skilled in the art.

We claim:

1. Apparatus for reproducing television signals recorded upon magnetic tape as a succession of record traces extending laterally of said tape, comprising the combination of: a rotatable member; a plurality of transducer heads peripherally spaced about said member; voltage-controlled drive means for rotating said member; guide means presenting said tape to said member; transport means for translating said tape through said guide means past said member, whereby said transducer heads scan said record traces to derive portions of said television signal therefrom; circuit means combining said signal portions into a reproduced television signal; means for deriving from said reproduced television signals first frame signals representing the termination of each complete frame thereof; a source of second frame signals repetitive at the repetition rate of said first frame signals; first phase comparator means yielding a first control voltage representing the phase difference between signals applied to first and second inputs thereof; circuit means for applying said first and second frame signals to said first and second inputs respectively of said first phase comparator means; second phase comparator means yielding a second control voltage representing the phase difference between signals applied to first and second inputs thereof; means for generating a speed signal having a frequency proportional to the speed of rotation of said member; a source of vertical synchronizing signals locked to said second frame signal; frequency multiplying means yielding an output signal having a frequency which is a predetermined multiple of that of an applied signal; circuit means for applying said vertical synchronizing signals to the input of said frequency multiplying means, said multiple being such that said output signal has a frequency equal to that of said speed signal; circuit means for applying said frequency multiplied output signals of said frequency multiplying means and said speed signals to said first and second inputs respectively of said second phase comparator means; and selector means for selecting either of said first or said second control voltage to control said drive means.

2. Apparatus for reproducing television signals recorded upon magnetic tape as a succession of record traces extending laterally of said tape, said traces being accompanied by a control track carrying signals representative of each said record trace, comprising the combination of: a rotatable member; a plurality of transducer heads peripherally spaced about said member; voltage-controlled drive means for rotating said member; guide means presenting said tape to said member; voltage-controlled transport means for translating said tape through said guide means past said member, whereby said transducer heads scan said record traces to derive portions of said television signal therefrom, circuit means combining said signal portions into a reproduced television signal; means for deriving from said reproduced television signal first frame signals representing the termination of each complete frame thereof; a source of second frame signals repetitive at the repetition rate of said first frame signal; first phase comparator means yielding a first control voltage representing the phase difference between signals applied to first and second inputs thereof; circuit means for applying said first and second frame signals to said first and second inputs respectively of said first phase comparator means; second phase comparator means yielding a second control voltage representing the phase difference between signals applied to first and second inputs thereof; means for generating a speed signal having a frequency proportional to the speed of rotation of said member; a source of vertical synchronizing signals locked to said second frame signal; frequency multiplying means yielding an output signal having a frequency which is a predetermined multiple of that of an applied signal; circuit means for applying said vertical synchronizing signals to the input of said frequency multiplying means, said multiple being such that said output signal has a frequency equal to that of said speed signal; circuit means for applying said frequency multiplied output signals of said frequency multiplying means and said speed signals to said first and second inputs respectively of said second phase comparator means; and selector means for selecting either said first or said second control voltage to control said drive means; means for deriving control signals from said control track; means for generating auxiliary signals repetitive at a rate representing the speed of rotation of said member multiplied by the number of said plurality of transducer heads; third phase comparator means yielding a third output voltage representing the phase difference between signals applied to first and second inputs thereof; circuit means applying said control signals and auxiliary signals to said first and second inputs respectively of said third phase comparator means; and means for applying said third control voltage to said tape transport means to control the speed of translation of said tape.

3. Apparatus in accordance with claim 2 and comprising also: manually operable phase shifting means connected to vary the phase of said auxiliary signals applied to said third phase comparator means; whereby election may be made of that one of said plurality of transducer heads which scans a sequence of traces on said tape recorded by a predetermined one of said heads.

4. Apparatus in accordance with claim 2 and comprising also: a coincidence circuit developing a selector-operating output voltage when two pulse signals applied thereto are coincident; a source of third frame signals representing synchronizing intervals preceding odd-line fields; coincidence means yielding an output voltage in response to concidence of applied pulse signals; circuit means applying said first and third frame signals to said coincidence means; and switch means operable to connect said output voltage of said coincidence means to operate said selector means, said switch means being coupled with said phase shifter means to operate when a predetermined state of adjustment of said phase shifter is reached so that when coincidence of said first and third frame signals is attained said selector means operates to connect said second control voltage to said drive means in place of said first control voltage.

5. Apparatus for reproducing television signals recorded upon magnetic tape as a succession of record traces extending laterally of said tape comprising the combination of: a rotatable member; a plurality of transducer heads peripherally spaced about said member; voltage-controlled drive means for rotating said member; guide means presenting said tape to said member; transport means for translating said tape through said guide means past said member, whereby said transducer heads scan said record traces to derive portions of said television signal therefrom; circuit means combining said signal portions into a reproduced television signal; means for deriving from said reproduced television first frame signals representing the termination of each complete frame thereof; a source of second frame signals repetitive at the repetition rate of said first frame signals; first phase comparator means yielding a first control voltage representing the phase difference between signals applied to first and second inputs thereof; circuit means for applying said first and second frame signals to said first and second inputs respectively of said first phase comparator means; second phase comparator means yielding a second control voltage representing the phase difference between signals applied to first and second inputs thereof; a reference oscillator yielding an output signal of a frequency determined by the value of a control voltage applied thereto; circuit means for applying said first control voltage to said reference oscillator; circuit means applying the output of said oscillator to an input of said second phase comparator; a source of vertical synchronizing signals; circuit means applying said vertical synchronizing signals to the other input of said second phase comparator; circuit means applying said second control voltage to control said reference oscillator; third phase comparator means yielding a third control voltage representing the phase difference between signals applied to first and second inputs thereof; circuit means applying the output of said oscillator to one input of said third phase comparator means generating a speed signal of which the frequency represents the speed of rotation of said member; circuit means applying said speed signal to the other input of said third phase comparator and circuit means applying said third control voltage to control said drive means.

6. Apparatus in accordance with claim 1 in which said means for deriving said first frame signals from said reproduced television signals comprises synchronizing signal separator means fed with said reproduced signals and yielding mixed synchronizing signals separated therefrom; frame gate means fed with said fixed synchronizing signals and comprising an unterminated delay line having a delay period such that reflected signals combine at its input with applied signals to yield signals of enhanced amplitude corresponding with the broad pulses only of said synchronizing signal; a first monostable trigger circuit including inhibiting means operable by applied pulses to prevent the triggering of said circuit; circuit means applying to said first trigger circuit signals appearing at the input of said delay line; said first trigger circuit responding only to said signals of enhanced amplitude and yielding when triggered a pulse of predetermined duration; means for differentiating said mixed synchronizing signals; rectifier means selecting from the differentiated signal pulse components of the polarity representing leading edges of said synchronizing signal; a second monostable trigger circuit yielding when triggered inhibiting pulses of predetermined duration somewhat exceeding one half a line period of said television signal; means applying said pulse components to trigger said second trigger circuit and circuit means applying said inhibiting pulses to cause said inhibiting means to prevent the actuation of first said trigger circuit; whereby said first trigger circuit yields an output pulse only in respect of those field synchronizing signals which precede an odd-line scanning field in said television signal.

References Cited

UNITED STATES PATENTS

| | | | |
|---|---|---|---|
| 3,016,428 | 1/1962 | Kabell | 179—100.2 |
| 3,270,130 | 8/1966 | Hurst | 178—6.6 |

ROBERT L. GRIFFIN, *Primary Examiner.*

H. W. BRITTON, *Assistant Examiner.*